(12) United States Patent
Chen et al.

(10) Patent No.: US 11,427,278 B2
(45) Date of Patent: Aug. 30, 2022

(54) SELF-BALANCING VEHICLE

(71) Applicant: E-LINK TECHNOLOGY CO., LTD, Shenzhen (CN)

(72) Inventors: Minyi Chen, Shenzhen (CN); Pingzhi Li, Shenzhen (CN); Xihui Jiang, Shenzhen (CN); Yufeng Chen, Shenzhen (CN)

(73) Assignee: E-LINK TECHNOLOGY CO., LTD, Shenzhen (CN)

( * ) Notice: Subject to any disclaimer, the term of this patent is extended or adjusted under 35 U.S.C. 154(b) by 123 days.

(21) Appl. No.: 17/026,326

(22) Filed: Sep. 21, 2020

(65) Prior Publication Data

US 2022/0024536 A1   Jan. 27, 2022

(30) Foreign Application Priority Data

Jul. 23, 2020   (CN) .......................... 202021470088.0

(51) Int. Cl.
   *B62K 11/00*   (2006.01)
(52) U.S. Cl.
   CPC .................................. *B62K 11/007* (2016.11)
(58) Field of Classification Search
   CPC .................................................... B62K 11/007
   USPC ......................................................... 180/218
   See application file for complete search history.

(56) References Cited

U.S. PATENT DOCUMENTS

| | | | | |
|---|---|---|---|---|
| 9,376,155 B2 * | 6/2016 | Ying | ...................... | B62D 51/02 |
| 9,840,302 B2 * | 12/2017 | Zeng | .................... | B62K 11/007 |
| 10,421,006 B1 * | 9/2019 | Li | .......................... | A63C 17/002 |
| 10,722,778 B1 * | 7/2020 | Li | ........................ | A63C 17/0093 |
| 10,800,472 B2 * | 10/2020 | Shang | ................... | B62K 11/007 |
| 11,130,543 B2 * | 9/2021 | Ying | ....................... | B62D 51/02 |
| 11,141,647 B2 * | 10/2021 | Li | ............................ | A63C 17/12 |
| 2019/0077479 A1 * | 3/2019 | Chen | .................... | B62K 11/007 |
| 2022/0009583 A1 * | 1/2022 | Cao | ......................... | B62K 11/02 |

FOREIGN PATENT DOCUMENTS

| | | | | | |
|---|---|---|---|---|---|
| CN | 205220928 U | * | 5/2016 | | |
| CN | 105882826 A | * | 8/2016 | | |
| CN | 205440668 U | * | 8/2016 | | |
| CN | 205440672 U | * | 8/2016 | | |
| CN | 207157385 U | * | 3/2018 | | |
| CN | 207496854 U | * | 6/2018 | | |
| CN | 111688860 A | * | 9/2020 | ............. | B60B 35/00 |

* cited by examiner

*Primary Examiner* — Kevin Hurley
*Assistant Examiner* — Hosam Shabara

(57) ABSTRACT

Disclosed is a self-balancing vehicle including a left housing assembly, a right housing assembly, a left wheel train, a right wheel train and a rotation mechanism. The left wheel train is connected with the left housing assembly. The first end of the rotation mechanism is connected with the right wheel train and the right housing assembly, and the second end of the rotation mechanism is inserted into the left housing assembly and rotationally connected with the left housing assembly. The rotation mechanism is just arranged in the right housing assembly, but connected with the right housing assembly and the right wheel train respectively, thus reducing the strength requirements of the self-balancing vehicle on the left housing assembly and simplifying the components of the left housing assembly.

9 Claims, 3 Drawing Sheets

SELF-BALANCING VEHICLE

TECHNICAL FIELD

The present disclosure relates generally to a self-balancing vehicle.

BACKGROUND

Nowadays, with the continuous improvement on the living conditions, people pay more and more attention to improving their life quality. Fitness, leisure and entertainment have become an indispensable part of people's life. Various forms of fitness and entertainment equipment emerge in endlessly. The self-balancing vehicle which is easy-to-use has become the trend of modern young people. The self-balancing vehicle has won everyone's interest through its small size, beautiful shape and flexible operation. At present, there are mainly two types of self-balancing vehicles on the market, one of which has a single wheel and the other one has double wheels. The double wheeled self-balancing vehicle has a higher safety factor, and is more suitable for walking out. The vehicle body of most existing self-balancing vehicle includes two-layer covers. Accordingly, the two vehicle bodies of the double wheeled self-balancing vehicle both comprise a top housing and an inner housing used to enhance the structural strength of the vehicle body, which make the structure of the self-balancing vehicle complex and inconvenient for production and installation.

SUMMARY

In the present disclosure, a self-balancing vehicle is provided, aiming at the shortcomings of the above existing technologies that the structure of the self-balancing vehicle is complex and inconvenient for production and installation.

In one aspect, a self-balancing vehicle is provided, which comprising a left housing assembly, a right housing assembly, a left wheel train, a right wheel train and a rotation mechanism; wherein the left wheel train is connected with the left housing assembly, a first end of the rotation mechanism is connected with the right wheel train and the right housing assembly, a second end of the rotation mechanism is inserted into the left housing assembly and rotationally connected with the left housing assembly.

Alternatively, the right housing assembly comprises a right top housing and a right bottom housing which are butted together to form a right cavity containing the rotation mechanism, wherein the rotation mechanism is connected with the right top housing.

Alternatively, the left housing assembly comprises a left top housing and a left bottom housing which are butted together to form a left cavity, wherein the rotation mechanism is inserted into the left cavity and rotationally connected with the left top housing.

Alternatively, the rotation mechanism comprises a rotation shaft, a right press block and a bearing, wherein the rotation shaft is connected with the right wheel train, the rotation shaft is pressed by the right press block which is connected with the right housing assembly, the bearing is sleeved on one end of the rotation shaft away from the right wheel train and is rotationally connected with the left housing assembly.

Alternatively, the rotation mechanism further comprises a plurality of snap springs, wherein the rotation shaft is provided with clamping grooves at two opposite sides relative to the bearing, and the plurality of snap springs are respectively limited in the clamping grooves and butted against the two opposite sides of the bearing.

Alternatively, the rotation mechanism further comprises a limiting press block and a limiting screw, wherein the bearing is pressed by the limiting press block which is fixedly connected with the left housing assembly and provided with a limiting groove, wherein the limiting screw is threaded through the limiting groove for connecting with the rotation shaft.

Alternatively, the right press block comprises a first press block and a second press block which are respectively pressed at different positions of the rotation shaft and are fixedly connected with the right housing assembly.

Alternatively, the rotation shaft comprises a first shaft, a second shaft and a pin, wherein the first shaft is connected with the right wheel train, one end of the second shaft is inserted into the first shaft through the pin, and an opposite end of the second shaft is inserted into the bearing; wherein first shaft is pressed by the first press block and the second shaft is pressed by the second press block.

Alternatively, the self-balancing vehicle further comprises a protective ring which is clamped between the left housing assembly and the right housing assembly, wherein the protective ring is provided with a wire hole for passing through an electrical wire.

Alternatively, the right housing assembly further comprises a right bracket, a right foot pedal and a right dust shield, wherein the right bracket is detachably connected with the right top housing, the right foot pedal is detachably connected with the right bracket, and the right dust shield is detachably connected to a side of the right top housing facing the right wheel train.

Following beneficial effects can be obtained by implementing the self-balancing vehicle suggested by the present disclosure. The rotation mechanism is just arranged in the right housing assembly, thus reducing the strength requirements of the self-balancing vehicle on the left housing assembly and simplifying the components of the left housing assembly. As the rotation mechanism is arranged in the right housing assembly and connected with the right wheel train, the right wheel train plays a supporting role for the rotation mechanism. The right wheel train has a high structural strength and strong load bearing capacity, so that the right wheel train shares the press born by the rotation mechanism, thus reducing the strength requirements of the self-balancing vehicle on the right housing assembly and simplifying the components of the right housing assembly.

BRIEF DESCRIPTION OF THE DRAWINGS

In order to explain the technical solutions in the embodiments of the present disclosure more clearly, the drawings used in the description of the embodiments are briefly introduced below. Obviously, the drawings in the following description are just some implementations of the present disclosure. For example, for one skilled in the art, other drawings can be obtained based on these drawings without any inventive work.

DETAILED DESCRIPTION OF THE PREFERRED EMBODIMENT

Figure 1:
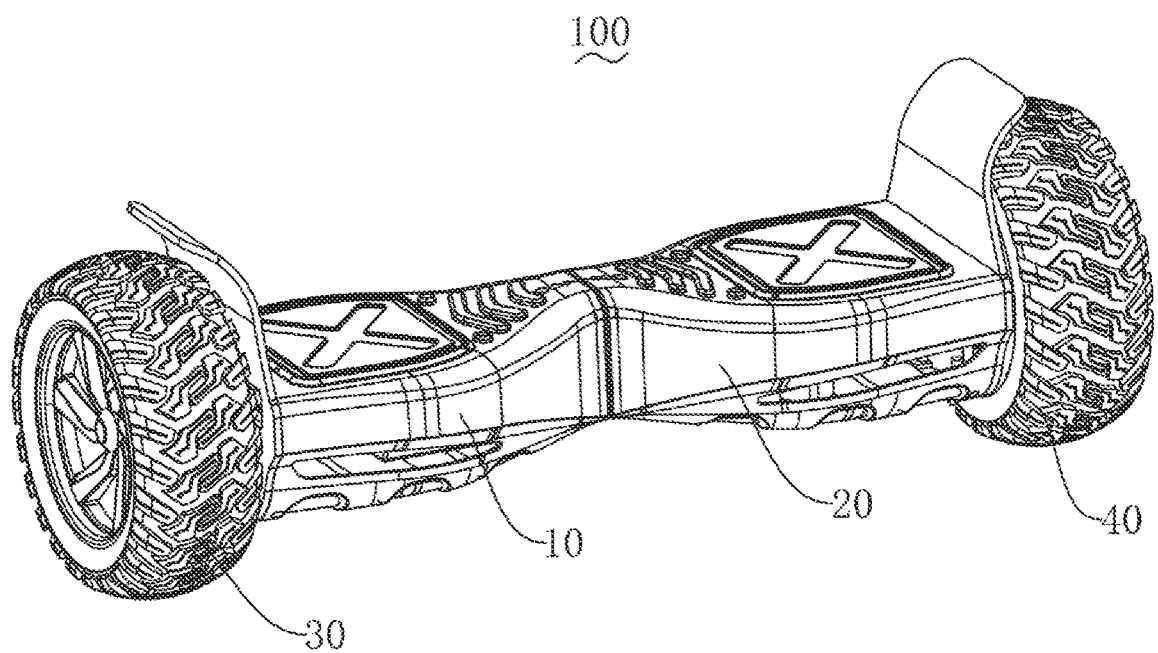
FIG. 1 is an assembled structural diagram of a self-balancing vehicle according to an embodiment of the present application.

The technical solutions in the embodiments of the present application will be clearly and completely described below with reference to the drawings in the embodiments of the present application. It can be understood that the specific embodiments described herein are only used to explain the present application, but not to limit the present application. It should also be noted that, for the convenience of description, only some components related to the present application instead of the entire structure are shown in the drawings. Based on the embodiments of the present application, all other embodiments obtained by one skilled in the art without any inventive work shall fall within the protection scope of the present application.

In the present disclosure, "Embodiments" herein means that the specific features, structures or features described in connection with the embodiments may be included in at least one embodiment of the present disclosure. The presence of the phrase in various locations in the specification does not necessarily refer to the same embodiment, nor is it an independent or alternative embodiment mutually exclusive with other embodiments. It is explicitly and implicitly understood by those skilled in the art that the embodiments described herein may be combined with other embodiments.

Figure 2:
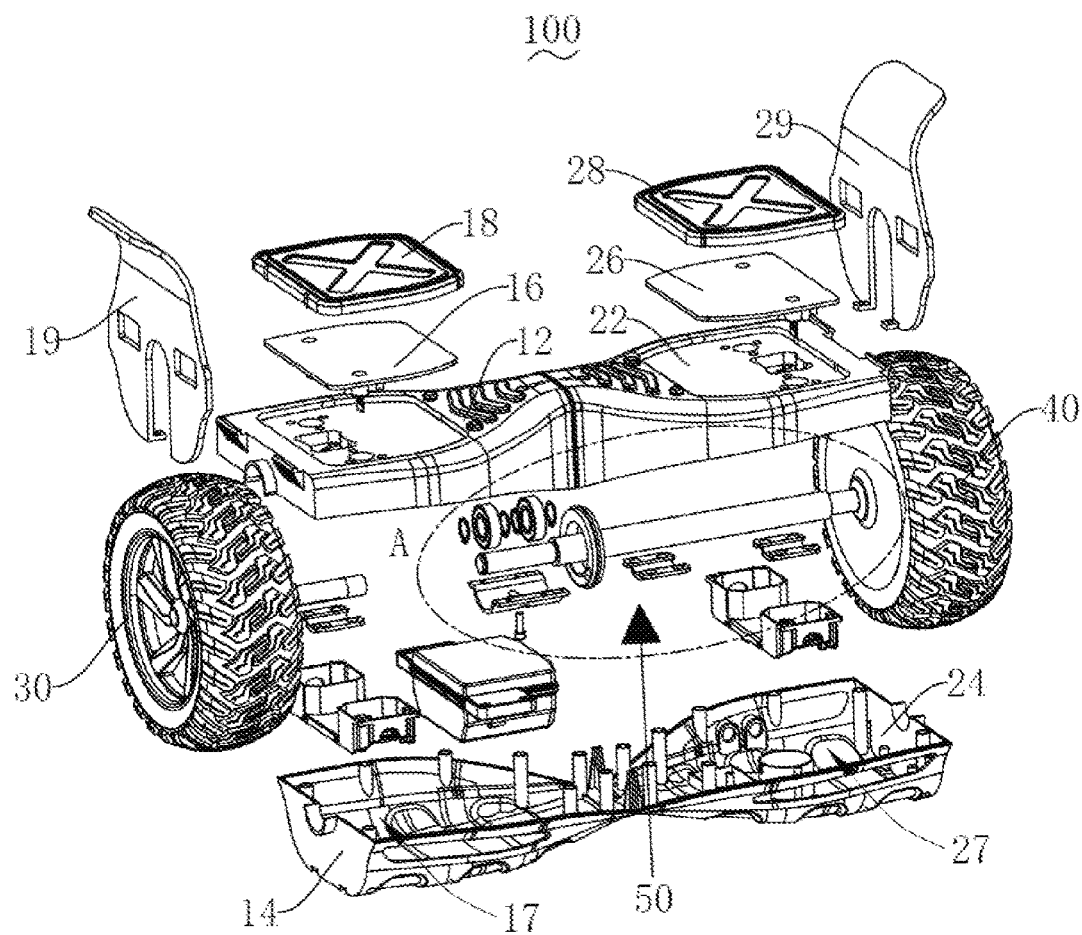
FIG. 2 is an exploded structural diagram of a self-balancing vehicle according to an embodiment of the present application.

Referring FIGS. 1-2, it can be seen that FIG. 1 is an assembled structural diagram of a self-balancing vehicle according to an embodiment of the present application and FIG. 2 is an exploded structural diagram of a self-balancing vehicle according to an embodiment of the present application.

The self-balancing vehicle 100 recited in the present disclosure is also called as Somatosensory vehicle, Segway tour and so on. There are mainly two types of self-balancing vehicles on the market, one of which has a single wheel and the other one has double wheels. The present disclosure focuses on the self-balancing vehicle with double wheels.

The operation principle of the self-balancing vehicle 100 is mainly based on a basic principle called dynamic stability. Specifically, the self-balancing vehicle 100 uses the gyroscope and acceleration sensor inside the vehicle body to detect the change of the vehicle body posture, and uses the servo control system to accurately drive the motor to make corresponding adjustment, so as to maintain the balance of the system.

For example, when the acceleration sensor detects that the self-balancing vehicle 100 inclines forward, the servo control system accurately drives the motor to accelerate. When the acceleration sensor detects that the self-balancing vehicle 100 inclines backward, the servo control system accurately drives the motor to slow down. When the acceleration sensor detects that the self-balancing vehicle 100 moves stably, the servo control system accurately drives the motor to move at a uniform speed.

The self-balancing vehicle 100 comprises a left housing assembly 10, a right housing assembly 20, a left wheel train 30, a right wheel train 40, and a rotation mechanism 50. Among them, "left" and "right" are only described according to the orientation of the attached drawings. It can be understood that "left" and "right" also change after the orientation of self-balancing vehicle 100 changes. Therefore, "left" and "right" do not constitute any limitation on the technical features of the application.

The left wheel train 30 is connected with the left housing assembly 10. One end of the rotation mechanism 50 is connected with the right wheel train 40 and connected with the right housing assembly 20, and the other end of the rotation mechanism 50 is inserted into the left housing assembly 10 and rotationally connected with the left housing assembly 10. That is, the left housing assembly 10 rotates relative to the right housing assembly 20 through the rotation mechanism 50. The left housing assembly 10 and the right housing assembly 20 rotate relative to each other through the rotation mechanism 50, thus inputting acceleration signals or deceleration signals to the acceleration sensor of the self-balancing vehicle 100. The left wheel train 30 can be formed by fixing the brush motor on the wheel body, and the right wheel train 40 can be formed by fixing the brush motor on the wheel body.

In this embodiment, the rotation mechanism 50 is just arranged in the right housing assembly 20, thus reducing the strength requirements of the self-balancing vehicle 100 on the left housing assembly 10, and simplifying the component composition of the left housing assembly 10. The rotation mechanism 50 is arranged in the right housing assembly 20 and is connected with the right wheel train 40 which plays a supporting role for the rotation mechanism 50. The right wheel train 40 has a high structural strength and strong load bearing capacity, so that the right wheel train 40 shares the press born by the rotation mechanism 50, thus reducing the strength requirements of the self-balancing vehicle 100 on the right housing assembly 20 and simplifying the components of the right housing assembly 20.

Specifically, the right housing assembly 20 includes a right top housing 22 and a right bottom housing 24 which are butted together to form a right cavity 27 containing the rotation mechanism 50. The rotation mechanism 50 is connected with the right top housing 22. The right wheel train 40 is inserted into the right cavity 27 and connected with the rotation mechanism 50.

The right top housing 22 and the right bottom housing 24 can be connected by clamping or by screws.

The right top housing 22 and the right bottom housing 24 are preferably made of plastic materials, such as ABS plastic, PC plastic, etc.

The left housing assembly 10 includes a left top housing 12 and a left bottom housing 14 which are butted to form a left cavity. The rotation mechanism 50 is inserted into the left cavity 17 and rotationally connected with the left top housing 12. The left wheel train 30 is inserted into the left cavity 17 and connected with the left top housing 12.

The left: top housing 12 and the left bottom housing 14 can be connected by clamping or by screws.

The left top housing 12 and the left bottom housing 14 are preferably made of plastic materials, such as ABS plastic, PC plastic, etc.

The right housing assembly 20 further comprises a right bracket 26, a right foot pedal 28 and a right dust shield 29. The right bracket 26 is detachably connected with the right top housing 22, the right foot pedal 28 is detachably connected with the right bracket 26, and the right dust baffle 29 is detachably connected to a side of the right top housing 22 facing the right wheel train 40. The right foot pedal 28 is used for the user to step on the right foot. Therefore, the detachable connection of the right foot pedal 28 is convenient for removing the right foot pedal 28 from the self-balancing vehicle 100 for cleaning. The right dust shield 29 is used to block the dust raised by the right wheel train 40 and prevent the dust from splashing on the right foot. Therefore, the detachable connection of the right dust shield 29 is convenient for removing the right dust baffle 29 from the self-balancing vehicle 100 for cleaning.

The right dust shield 29 is bent and extended from the right top housing 22 toward the right wheel train 40 to form an inclination angle toward the right wheel train 40, so as to prevent the water and dust on the right dust baffle 29 from the user's right foot.

The left housing assembly 10 further comprises a left bracket 16, a left foot pedal 18 and a left dust shield 19. The left bracket 16 is detachably connected with the left top housing 12, the left foot pedal 18 is detachably connected with the left bracket 16, and the left dust shield 19 is detachably connected to a side of the left top housing 12 facing the left wheel train 30. The left foot pedal 18 is used for the user to step on the left foot. Therefore, the detachable connection of the left foot pedal 18 is convenient for removing the left foot pedal 18 from the self-balancing vehicle 100 for cleaning. The left dust shield 19 is used to block the dust raised by the left wheel train 30 and prevent the dust from splashing on the left foot. Therefore, the detachable connection of the left dust baffle 19 is convenient for removing the left dust baffle 19 from the self-balancing vehicle 100 for cleaning.

The left dust shield 19 is bent and extended from the left top housing 12 toward the left wheel train 30 to form an inclination angle toward the left wheel train 30, so as to prevent the water and dust on the left dust baffle 19 from the user's left foot.

Figure 3:
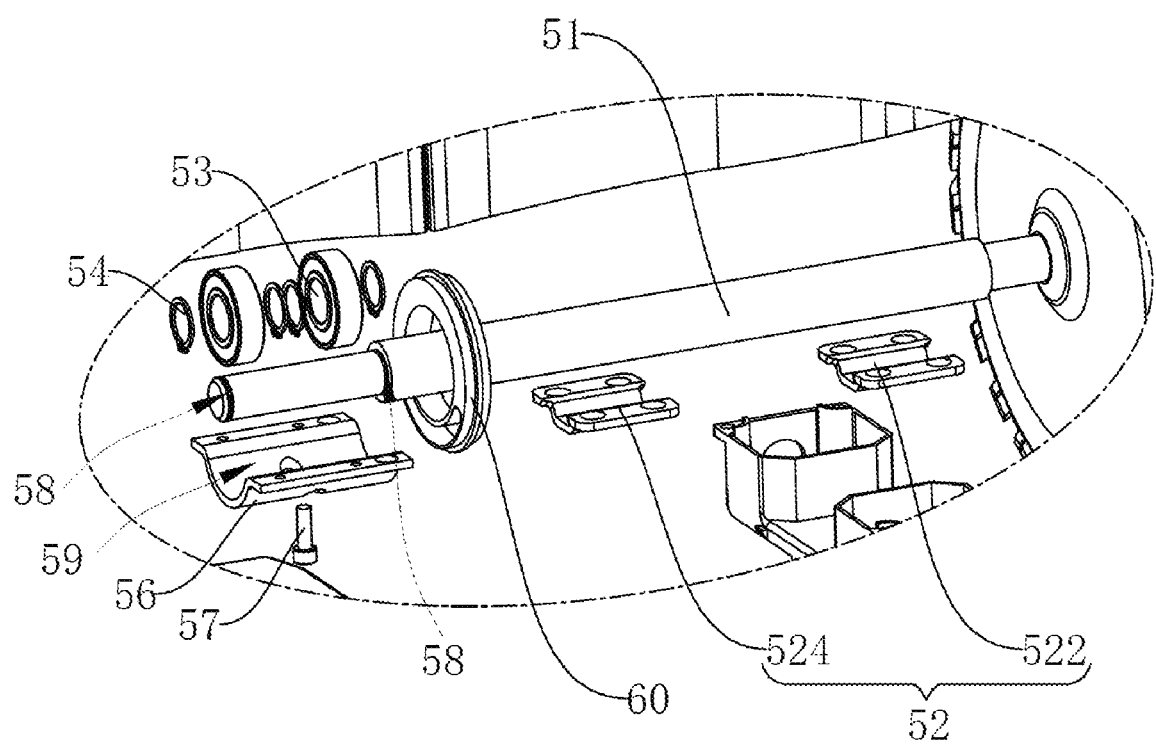
FIG. 3 is an enlarged schematic diagram of area A in FIG. 2.

Please refer to FIG. 1 to FIG. 3, which is enlarged schematic diagram of area A in FIG. 2.

The rotation mechanism 50 comprises a rotation shaft 51, a right press block 52 and a bearing 53. The rotation shaft 51 is connected with the right wheel train 40. The rotation shaft 51 is pressed by the right press block 52 which is connected with the right housing assembly 20 for fixing the rotation shaft 51. The bearing 53 is contained in the left housing assembly 10 and sleeved on one end of the rotation shaft 51 away from the right wheel train 40 and is rotationally connected with the left housing assembly 10. The left housing assembly 10 rotates relative to the rotation shaft 51 and the right housing assembly 20 through the bearing 53.

The number of bearings 53 can be one, two, three, etc.

The rotation mechanism 50 further comprises a plurality of snap springs 54, wherein the rotation shaft 51 is provided with clamping grooves 58 at two opposite sides relative to the bearing 53. The number of snap springs 54 is related to the number of bearings 53. When there is one bearing 53, there are two snap springs 54. When there are two bearing 53, there are four snap springs 54. A plurality of snap springs 54 are respectively limited in the clamping grooves 58 and butted against the two opposite sides of the bearing 53. The snap springs 54 on both sides of the bearing 53 interact with each other to restrict the bearing 53 from moving in the axial direction of the rotation shaft 51, thus ensuring the rotation stability of the left housing assembly 10 with respect to the right housing assembly 20 through the bearing 53.

The snap spring 54 has a half-ring shape, and is deformed by the pulling of the external force to be sleeved on the rotation shaft 51. When the external force disappears, the snap spring 54 is recovered to be limited in the clamping groove, thus limiting one side of the bearing 53.

The snap spring 54 is preferably made of spring steel.

The rotation mechanism 50 further comprises a limiting press block 56 and a limiting screw 57. The bearing 53 is pressed by the limiting press block 56 which is fixedly connected with the left housing assembly 10. The limiting press block 56 is provided with a limiting groove 59. The limiting screw 57 is threaded through the limiting groove 59 for connecting the rotation shaft 51. The limiting screw 57 can only move in the limiting groove 59, thus limiting the rotation of the left housing assembly 10 within a preset angle. The preset angle can be from plus or minus 30 degrees to plus or minus 45 degrees.

Specifically, when the left housing assembly 10 rotates, the left housing assembly 10 drives the limiting press block 56 to rotate. When the limiting press block 56 abuts against the limiting screw 57, the further movement of the left housing assembly 10 is prevented, such that it plays a limiting role.

The right press block 52 includes a first press block 522 and a second press block 524 which are respectively pressed at different positions of the rotation shaft 51 and are fixedly connected with the right housing assembly 20, so as to evenly press the rotation shaft 51. In theory, as long as the space allows, a third press block, a fourth press block and so on also can be provided.

The self-balancing vehicle 100 further comprises a protective ring 60, which is clamped between the left housing assembly 10 and the right housing assembly 20. The protective ring 60 is provided with a wire hole for passing through an electrical wire. The protective ring 60 is preferably made of metal.

Figure 4:
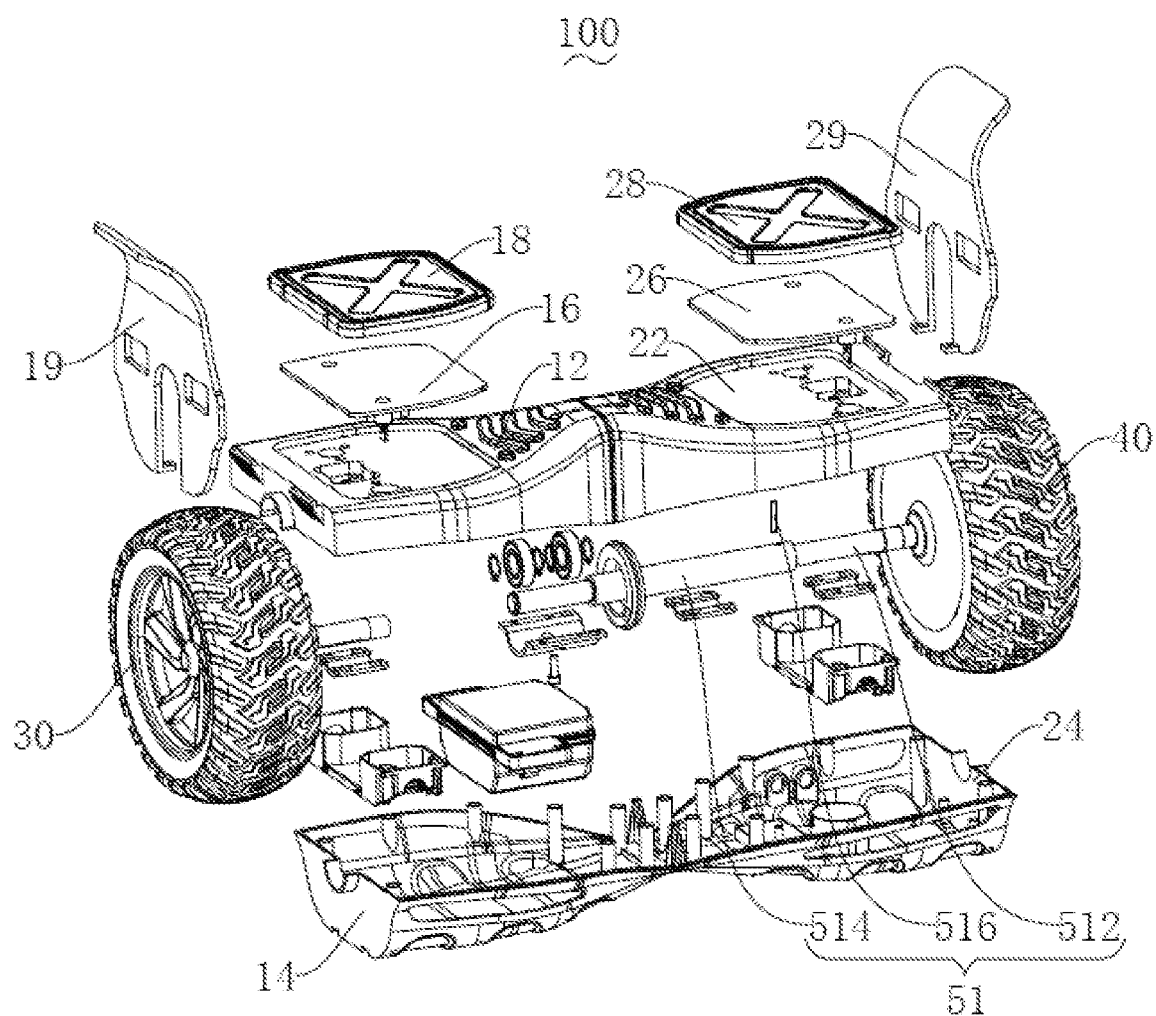
FIG. 4 is an assembled structural diagram of a self-balancing vehicle according to a further embodiment of the present application.

Referring FIG. 4, it is an assembled structural diagram of a self-balancing vehicle according to a further embodiment of the present application, which is different from the above embodiment as follows.

The rotation shaft 51 comprises the first shaft 512, the second shaft 514 and the pin 516. The first shaft 512 is connected with the right wheel train 40. When the second shaft 514 is the motor shaft of the right wheel train 40, one end of the second shaft 514 is inserted into the first shaft 512 through the pin 516, and the opposite end of the second shaft 514 is inserted in the bearing 53. Specifically, the ends of the first shaft 512 and the second shaft 514 are provided with a pair of through holes, and the pin 516 is inserted into the through holes to realize the connection between them. The first press block 522 presses the first shaft 512, and the second press block 524 presses the second shaft 514 to fix the first shaft 512 and the second shaft 514 respectively. In this embodiment, the rotation shaft 51 is divided into two parts, and then connected together by the pin 516, which is not only convenient for the product assembly, but also convenient for processing of the rotation shaft 51, so as to ensure that the straightness of the rotation shaft 51 is within the tolerance range.

While the present application has been described with reference to certain embodiments, it will be understood by those skilled in the art that various changes may be made and equivalents may be substituted without departing from the scope of the present application. In addition, many modifications may be made to adapt a particular situation or material to the teachings of the present application without departing from its scope. Therefore, it is intended that the present application not be limited to the particular embodiment disclosed, but that the present application will include all embodiments falling within the scope of the appended claims.

What claimed is:

1. A self-balancing vehicle comprising a left housing assembly, a right housing assembly, a left wheel train, a right wheel train and a rotation mechanism; wherein the left wheel train is directly connected with the left housing assembly, a first end of the rotation mechanism is connected with the right wheel train and the right housing assembly, a second end of the rotation mechanism is inserted into the left housing assembly and rotationally connected with the left housing assembly;

wherein the rotation mechanism comprises a rotation shaft, a right press block and a bearing, wherein the rotation shaft is connected with the right wheel train, the rotation shaft is pressed by the right press block which is connected with the right housing assembly, the bearing is sleeved on one end of the rotation shaft away from the right wheel train and is directly and rotationally connected with the left housing assembly;

wherein the right press block comprises a first press block and a second press block which are respectively pressed at different positions of the rotation shaft and are fixedly connected with the right housing assembly; and wherein the rotation shaft comprises a first shaft, a second shaft and a pin, wherein the first shaft is connected with the right wheel train, one end of the second shaft is inserted into the first shaft through the pin, and an opposite end of the second shaft is inserted into the bearing; wherein the first shaft is directly pressed by the first press block and the second shaft is directly pressed by the second press block.

2. The self-balancing vehicle according to claim 1, wherein the right housing assembly comprises a right top housing and a right bottom housing which are butted together to form a right cavity containing the rotation mechanism, wherein the rotation mechanism is connected with the right top housing.

3. The self-balancing vehicle according to claim 1, wherein the left housing assembly comprises a left top housing and a left bottom housing which are butted together to form a left cavity, wherein the rotation mechanism is inserted into the left cavity and rotationally connected with the left top housing.

4. The self-balancing vehicle according to claim 1, wherein the rotation mechanism further comprises a plurality of snap springs, wherein the rotation shaft is provided with clamping grooves at two opposite sides relative to the bearing, and the plurality of snap springs are respectively limited in the clamping grooves and butted against the two opposite sides of the bearing.

5. The self-balancing vehicle according to claim 1, wherein the rotation mechanism further comprises a limiting press block and a limiting screw wherein the bearing is pressed by the limiting press block which is fixedly connected with the left housing assembly and provided with a limiting groove, wherein the limiting screw is threaded through the limiting groove for connecting with the rotation shaft.

6. The self-balancing vehicle according to claim 1, wherein the self-balancing vehicle further comprises a protective ring which is clamped between the left housing assembly and the right housing assembly, wherein the protective ring is provided with a wire hole for passing through an electrical wire.

7. The self-balancing vehicle according to claim 1, wherein the right housing assembly further comprises a right bracket, a right foot pedal and a tight dust shield, wherein the right bracket is detachably connected with the right top housing, the right foot pedal is detachably connected with the right bracket, and the right dust shield is detachably connected to a side of the right top housing facing the right wheel train.

8. The self-balancing vehicle according to claim 1, wherein the first shaft comprises an exposed area exposed from the second shaft, and the exposed area of the first shaft is directly pressed by the first press block.

9. A self-balancing vehicle comprising a left housing assembly, a right housing assembly, a left wheel train, a right wheel train and a rotation mechanism; wherein the left wheel train is connected with the left housing assembly, a first end of the rotation mechanism is connected with the right wheel train and the right housing assembly, a second end of the rotation mechanism is inserted into the left housing assembly and rotationally connected with the left housing assembly;

wherein the rotation mechanism comprises a rotation shaft, a right press block and a bearing, wherein the rotation shaft is connected with the right wheel train, the rotation shaft is pressed by the right press block which is connected with the right housing assembly, the bearing is sleeved on one end of the rotation shaft away from the right wheel train and is rotationally connected with the left housing assembly;

wherein the right press block comprises a first press block and a second press block which are respectively pressed at different positions of the rotation shaft and are fixedly connected with the right housing assembly; and wherein the rotation shaft comprises a first shaft, a second shaft and a pin, wherein the first shaft is connected with the right wheel train, one end of the second shaft is inserted into the first shaft through the pin, and an opposite end of the second shaft is inserted into the bearing; wherein the first shaft is directly pressed by the first press block and the second shaft is directly pressed by the second press block;

wherein the first shaft comprises an exposed area exposed from the second shaft, and the exposed area of the first shaft is directly pressed by the first press block.

\* \* \* \* \*